United States Patent [19]

Berry et al.

[11] Patent Number: 4,789,962
[45] Date of Patent: Dec. 6, 1988

[54] METHODS OF DISPLAYING HELP INFORMATION NEAREST TO AN OPERATION POINT AT WHICH THE HELP INFORMATION IS REQUESTED

[75] Inventors: Richard E. Berry, Georgetown; Steven E. Johnson; Thomas M. Ruiz, both of Austin, all of Tex.

[73] Assignee: International Business Machines Corporation, Armonk, N.Y.

[21] Appl. No.: 80,180

[22] Filed: Jul. 30, 1987

Related U.S. Application Data

[63] Continuation of Ser. No. 666,794, Oct. 31, 1984, abandoned.

[51] Int. Cl.$^4$ ............................................. G06F 3/14
[52] U.S. Cl. .................................. 364/900; 364/521; 340/721
[58] Field of Search ... 364/200 MS File, 900 MS File, 364/518, 521; 340/721, 747

[56] References Cited

U.S. PATENT DOCUMENTS

| 4,500,964 | 2/1985 | Nickle | 364/300 |
| 4,516,156 | 5/1985 | Fabris et al. | 340/712 X |
| 4,574,364 | 3/1986 | Tabata et al. | 364/900 |
| 4,586,035 | 4/1986 | Baker et al. | 340/712 |
| 4,591,997 | 5/1986 | Grabel | 358/518 X |
| 4,677,585 | 6/1987 | Ikegami et al. | 364/900 |

OTHER PUBLICATIONS

"Introducing the Macintosh", by Charles Duff, McGraw-Hill Book Company, 1984, pp. 121-130.

Primary Examiner—Raulfe B. Zache
Assistant Examiner—Thomas C. Lee
Attorney, Agent, or Firm—J. H. Barksdale, Jr.; H. St. Julian

[57] ABSTRACT

A method of, and placing help information on a convenient but unneeded portion of a screen. Help information, when called, is placed on the screen adjacent an operating point, and positioned such that needed information adjacent the point is not covered up or blocked from view.

5 Claims, 3 Drawing Sheets

FIG. 1 - SCREEN DIVIDED IN QUADRANTS
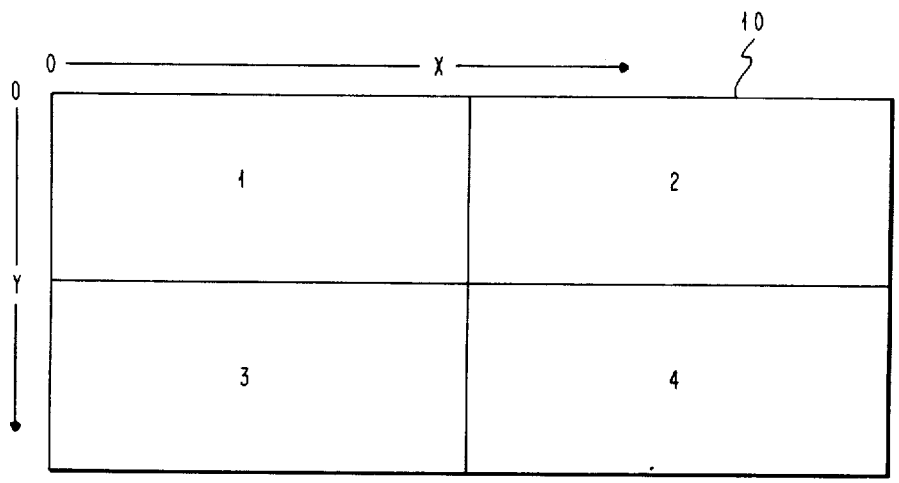
FIG. 2 - CASE 1: FULL-SCREEN
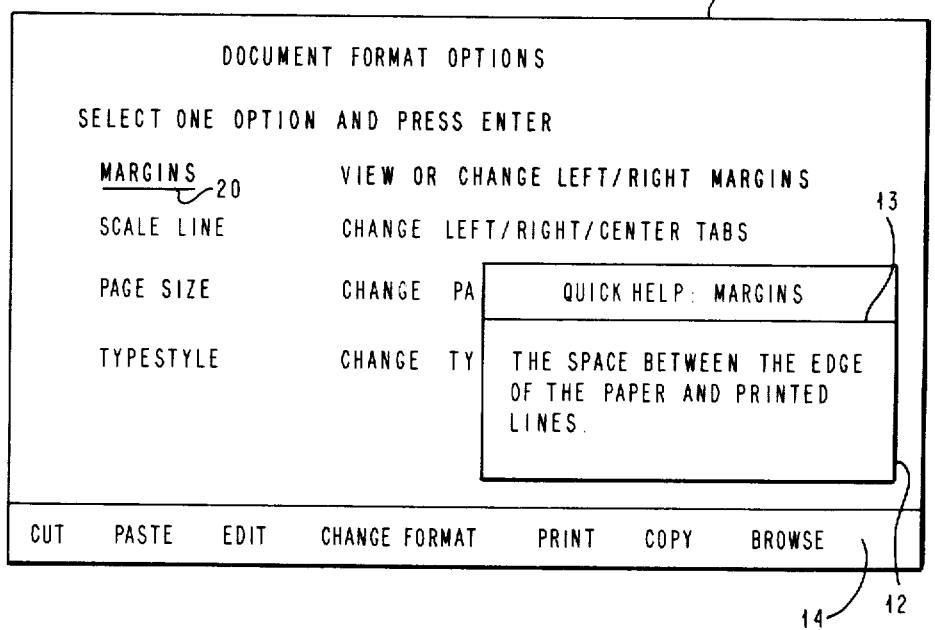

FIG. 3 — CASE 2: PRIMARY WINDOW AND HELP WINDOW WITHOUT OVERLAP
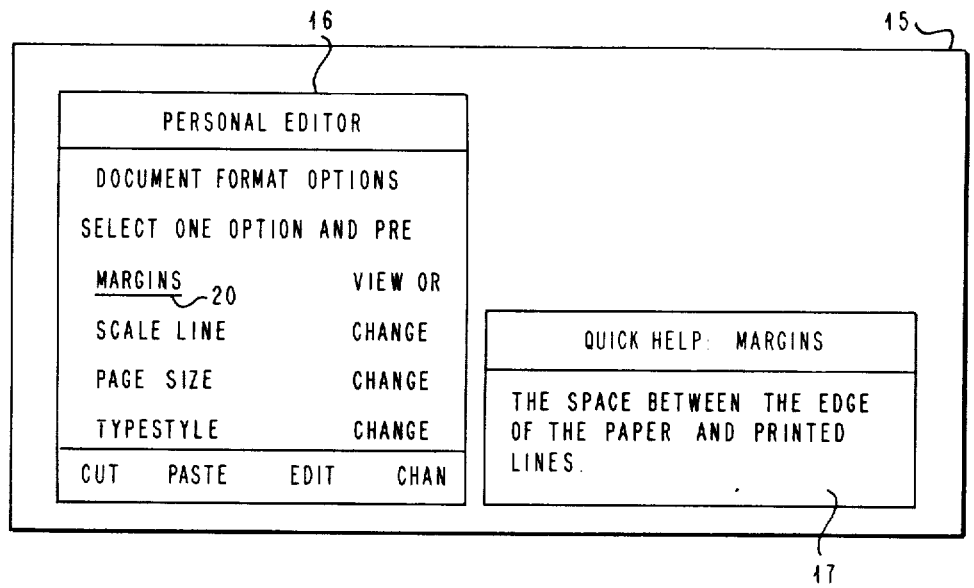
FIG. 4 — CASE 3: PRIMARY WINDOW AND HELP WINDOW OVERLAP
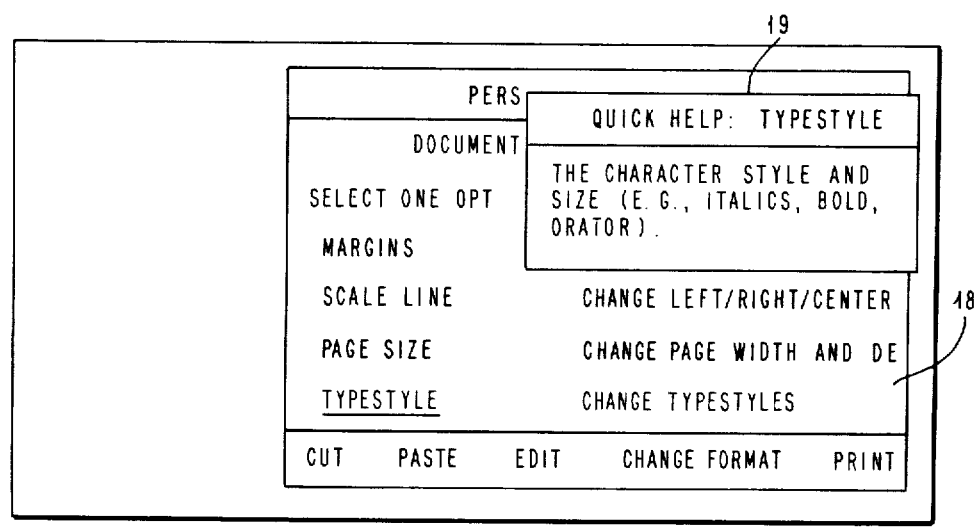

METHODS OF DISPLAYING HELP INFORMATION NEAREST TO AN OPERATION POINT AT WHICH THE HELP INFORMATION IS REQUESTED

This is a continuation of application Ser. No. 666,794 filed Oct. 31, 1984, now abandoned.

TECHNICAL FIELD

This invention relates generally to help facilities, and more specifically to placement of called help on a screen.

BACKGROUND ART

Within the market place there exist many applications having windowing capabilities for handling split screens, audit windows, moveable bordered viewports, etc. With these applications, a window occupies a portion of a display screen of a keyboard/display standalone or host connected computer system. The remainder of the screen can be dedicated to other chores, documents, etc.

Prior art help is information that can be presented in a window on the same screen from which help is called. When an operator or user needs assistance, a help or equivalent key is depressed and help information is displayed. However, when help is displayed on the same screen, it is positioned at a dedicated location. This often results in pertinent information being blocked from view. This alone can restrict a user's dialog with the system.

Also, available in the help area is relational contextual help. A call for help when operating within an AGE field, for example, will result in help being displayed related to the AGE field. In fact, displayed help can carry a heading AGE as a reference which can be used to correlate the help information and the field.

With the above prior art in mind, the instant invention is concerned with displaying called help in a window on the same screen where help is required, and in a manner to least interfere with the other information on the screen. More specifically, the instant invention is to position the window adjacent an operating point at which help is called and to display help information in the window related to the point. In this sense, contextual help is provided which is both relational and positional. Further, a blank area of the screen adjacent the operating point is sought for positioning the help window. This is to avoid blocking pertinent information from view during a display of help. By not blocking pertinent information, a user dialog with the system can be continued.

From the above, the prior art is pertinent to varying degrees, but falls short of either anticipating the instant invention, or rendering the instant invention obvious. The advantages of the instant invention are that help is displayed on the same screen with a job and as close to the operating point as feasible. These advantages result in more meaningful help, less confusion, and a friendlier user interface.

SUMMARY OF THE INVENTION

A unique method of, and system for, helping a user is provided such that user friendliness is improved and confusion is reduced. When help is called, a blank area on a display screen adjacent an operating point is sought. A determination is made as to whether a minimum amount of meaningful help can be displayed in this blank area. If so, sufficient help information to fill the blank area is windowed and displayed in the blank area. If the blank area is of insufficient size to carry a minimum amount of meaningful help information, a minimum amount of meaningful help information is windowed and displayed on the screen adjacent the operating point. If additional help information is needed, the user can call for scrolling or an increase in the size of the window. If the window is covering up needed information, the user can call for either decreasing the size of the window, or move the window to a more convenient position on the screen.

BRIEF DESCRIPTION OF THE DRAWINGS

FIG. 1 is a pictorial representation of a display screen grid made up of quadrants.

FIG. 2 is a pictorial representation of a filled-in display screen with help displayed in a window in one of the quadrants.

FIG. 3 is a pictorial representation of a screen containing a windowed menu and help displayed on a window in an unused portion of the screen.

FIG. 4 is another pictorial representation of a screen containing a windowed menu with help displayed in a window overlaying a portion of the menu.

DESCRIPTION OF THE PREFERRED EMBODIMENT

General Description and Definitions

Figure 5:
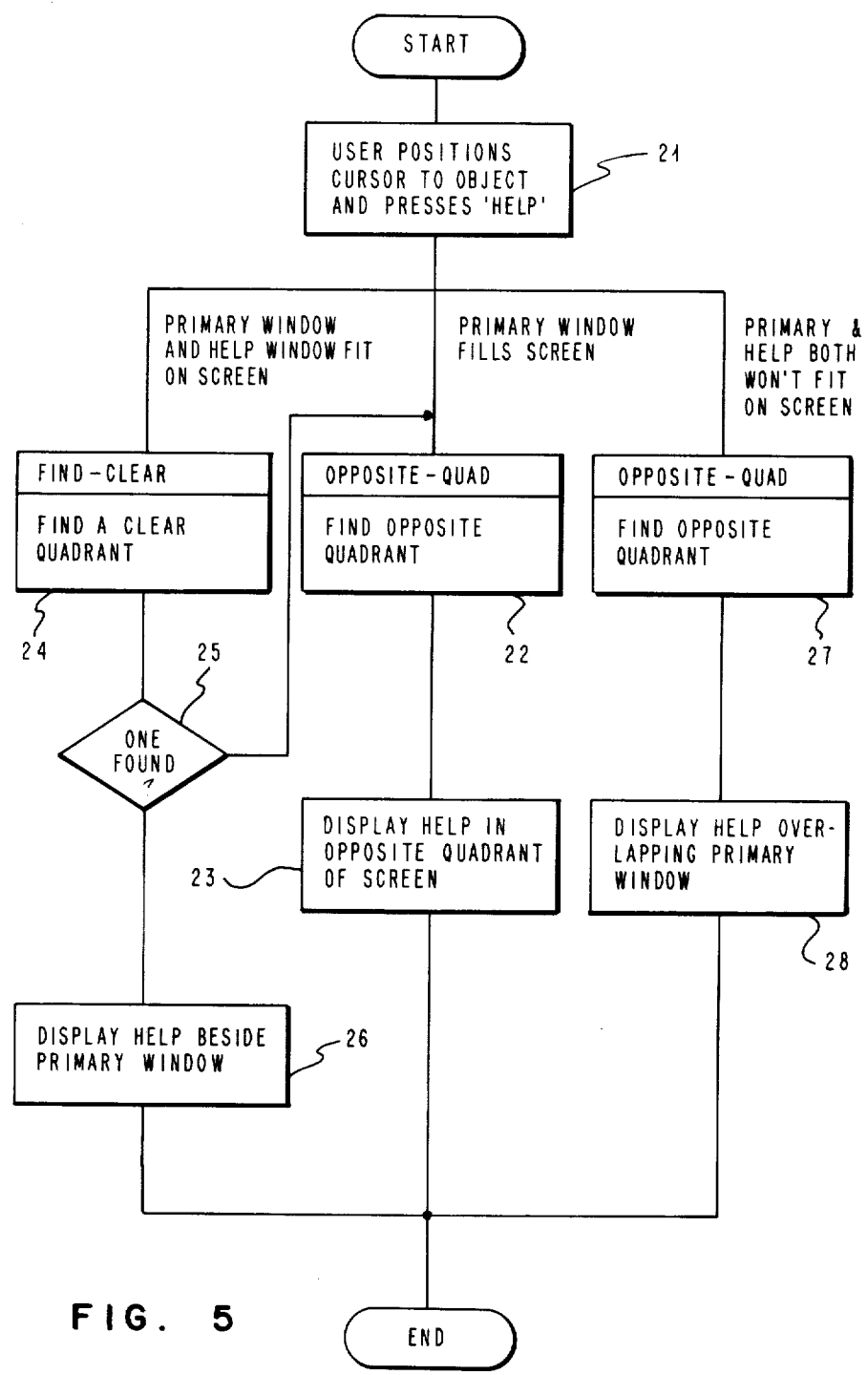
FIG. 5 is a flow chart illustrating user and system operations for causing help to be provided in a user friendly manner.

In using a keyboard/display standalone or host connected computer system, there are often instances where a user needs assistance. Assistance is conveniently provided on the display screen, when called, in terms of help or help information. This information can be a definition of an item, guidance in terms of the next user operation to be performed, where to seek additional information, etc. For example, if (a) a menu is presented to a user, (b) one of the options is "margins", and (c) this term is not totally understood, help can be called for a definition. Help, if displayed on a separate screen, can present a problem in that help may have to be called to get back to the original screen. If displayed on the same screen, pertinent information may be covered up.

Although a user has traditionally been a programmer, and an operator one who uses an application program written by a user, the two can be considered synonymous for purposes of this application. Both require help from time to time. This is so even though the help information may be differently tailored or worded. Since this invention deals with how help is presented as opposed to how it is tailored, no need exists for distinguishing between a user and an operator.

Help according to this invention is provided within a window on the face of a cathode ray tube (CRT) display included in the system. A screen for purposes of this application is information being displayed at any particular time on the face of the CRT. It is to be considered the same screen when help information is windowed and displayed with the information. The window will occupy a portion of the screen and for purposes of distinguishing the information in the window from the remainder of the information on the screen, the window will be bordered.

For purposes of this application, a field will occupy a portion of the screen and contain related information. When a text paragraph covers the entire screen, the field is equal to the screen. When the field is a column for AGE, the field will be defined by the column width and length.

In many instances, whether operation is textual, columnar, etc., there will be blank space on the screen. This blank space represents an unused portion of the screen which may be filled in with help when called. With the information on the screen formatted, the largest block of blank space adjacent the operating point is sought. If it is large enough to contain a minimum amount of meaningful help, help is displayed in this blank space. This is so irrespective of whether the blank space is within or without the field. Of course, if the blank space is large enough to contain more than a minimum amount of help, the blank space can be filled with help. If there is insufficient blank space for help, then a portion of the field is overlayed with a minimum amount of help adjacent the operating point. If additional help information is then needed, the help window can be enlarged, or help information scrolled within the help window. The result of enlarging the help window will be less of the field available for viewing.

If information already on the screen has been overlayed with help and the overlayed information is needed, the window can either be diminished in size or moved. The sizing of a window in terms of increasing and decreasing its size, and the scrolling of information within a window are covered in copending U.S. patent application Ser. No. 605,545, filed Apr. 30, 1984, now U.S. Pat. No. 4,714,918, and entitled Window View Control.

With the above placement, sizing, etc., of help, the object is to leave viewable as much as practicable of the field containing the operating point.

The operating point is usually the position of a cursor which may be addressing a line, character, column, etc. If there is stored help related to the cursor position, then a call for help will result in this help being called. It is to be noted that if there is no stored help for a cursored word, for example, then a determination is made as to whether there is stored help for the field containing the cursor. If so, this help is displayed. Also, the stored help will be labelled, and when displayed, the labelling will be used as a heading for the window. For example, a call for help when operating on a Margins row on a selection menu can result in a display of a help window with a Margins heading.

Described in the preceding paragraph is contextual help in a traditional or relational sense. This traditional help also forms part of this invention.

DETAILED DESCRIPTION

For a more detailed understanding of the invention, reference is first made to FIG. 1. In this figure is shown a display screen grid 10 made up of quadrants. The denominator used to divide the screen and the vertical and horizontal divisions obtained are convenient for a 25 line by 80 character display. For larger displays, a different denominator and only horizontal divisions may prove ideal. For smaller screens, a single vertical division may meet most needs. The reason for the grid is that it facilitates location of blank areas on a screen for placement of help information.

Refer next to FIG. 2. In this figure is shown a full screen display of a selection menu screen 11. On the menu are a number of options such as MARGINS, SCALE LINE, etc. Selection of one of these options is by cursoring a choice and then depressing an ENTER key on the keyboard (not shown) included in the system. For purposes of this application, the cursor is an underline such as line 20 shown below MARGINS. Cursoring down one line will cause the underline to be displayed under SCALE LINE.

Selection of MARGINS upon depressing the ENTER key will cause another screen to be displayed. On this other screen will be the left and right margins for the job to be, or being, performed. These margins may be presented as marks on a scale line, vertical lines extending down the screen, etc.

With the underline under MARGINS, depression of a HELP, or equivalent function key on the keyboard will result in help being displayed.

For help to be displayed, a quadrant from FIG. 1 is sought having sufficient blank space to position a minimum amount of meaningful help. Since no such quadrant exists, a minimum amount of meaningful help is written into and over a portion of the information in the 4th quadrant. The reason this quadrant is selected rather than the 3rd quadrant is that help was called while MARGINS was cursored. MARGINS forms part of an option field with related information. SCALE LINE, PAGE SIZE and TYPESTYLE are the other parts of the option field. It is desirable not to have related information overlayed or covered up with help. The reason help is not written into the second quadrant is that this quadrant also contains information related to MARGINS. This information is the wording "view or change left/right margins."

By positioning help in the 4th quadrant, all remaining options, such as PAGE SIZE, are still available for cursoring and calling help.

Help which is displayed in the 4th quadrant is windowed information. That is, a window is created in screen 11 of sufficient size to contain the help information within border 12. Border 12 is used to distinguish help from the remainder of the information on screen 11. Also, a heading Margins is provided to tie help to MARGINS in the option field. This provides for a visual check as to whether desired help is being displayed. Below the heading Margins is a separator line 13 and below line 13 is a definition of margins.

In the preferred embodiment, the command line 14 is not to be covered up with help.

From the above, when help is called, it is displayed in an available blank area on the screen. If no such area exists, or is of insufficient size to house help, help is written over existing information which is not related to the operating point, but as close as possible to the operating point. The operating point in the above is the underline under MARGINS.

Referring next to FIG. 3, there is shown a screen 15. On screen 15 are windowed options of selection menu 16, and windowed help 17 occasioned by the calling of help while cursoring MARGINS. One result of windowing menu 16 as shown is that the screen is vertically divided leaving the right half available for help 17. This is a particularly attractive embodiment in that much more room is available for help information. Also, as windowed, the option field is left intact.

Refer next to FIG. 4. Again, an option menu 18 has been windowed. When help is called, there must be some overlap of menu 18. This is since there is insufficient room for help 19 without an overlap. The least overlap for cursored TYPESTYLE will result if help is positioned in the second quadrant.

Reference is next made to the following illustration of a routine or application program in conjunction with the flow chart of FIG. 5. The flow chart illustrates operator and system operations for causing help to be placed on a screen in the most helpful, but unobstructive manner. The routine is useable by a processor included in the system for placing help on the screen when called. This routine is in program design language from which source and machine code are derivable.

```
PROCEDURE POSITION_WINDOW (PRI_WIDTH,
PRI_HEIGHT,
    HELP_WIDTH, HELP_HEIGHT, OBJ_LOC_X,
    OBJ_LOC_Y, HELP_LOC_X, HELP_LOC_Y)
CASE
1:PRI_WIDTH=SCREEN_WIDTH
    CALL OPPOSITE_QUAD (OBJ_LOC_X, OBJ_LOC_Y)
    --FIG. 2 - Case 1--
    --Help will be located in quadrant opposite to
    that which object is in - see procedure
    OPPOSITE_QUAD below--
2:PRI_WIDTH + HELP_WIDTH < SCREEN_WIDTH
  BEGIN
    CALL FIND_CLEAR (CLEAR_QUAD)
      CASE
        1:CLEAR_QUAD=0
          CALL OPPOSITE_QUAD (OBJ_LOC_X,
          OBJ_LOC_Y)
          --FIG. 4 - Case 3--
          --Find a quadrant clear of option
          column and other windows.
          If no clear quadrants, Help
          will be located in quadrant opposite
          to that which object is in - see
          procedure OPPOSITE_QUAD below--
        2:CLEAR_QUAD=1
          HELP_LOC_X=SCREEN_LEFT + 1
          HELP_LOC_Y=SCREEN_TOP + 1
          --Help will be in quadrant 1--
        3:CLEAR_QUAD=2
          HELP_LOC_X=SCREEN_RIGHT -
          HELP_WIDTH
          HELP_LOC_Y=SCREEN_TOP + 1
          --Help will be in quadrant 2--
        4:CLEAR_QUAD=3
          ''
          ''
          --Help will be in quadrant 3--
        5:CLEAR_QUAD=4
          ''
          ''
          --FIG. 3 - Case 2--
          --Help will be in quadrant 4--
      ENDCASE
    END
  OTHERWISE
    BEGIN
      CALL OPPOSITE_QUAD (OBJ_LOC_X,
      OBJ_LOC_Y)
      --FIG. 4 - Case 3--
      --Help will be located in quadrant opposite to
      that which object is in - see procedure
      OPPOSITE_QUAD below--
    END
ENDCASE
PROCEDURE OPPOSITE_QUAD (OBJ_LOC_X,
OBJ_LOC_Y)
--Locate Help window in the quadrant opposite to
that in which the object of the Help is located--
  BEGIN
    CALL QUADRANT (OBJ_LOC_X, OBJ_LOC_Y,
    QUADRANT)
      CASE
        --Object Location--
        1:QUADRANT=1
          BEGIN
          --Help will be in quadrant 4--
          HELP_LOC_X=SCREEN_RIGHT -
          HELP_WIDTH
          HELP_LOC_Y=SCREEN_BOTTOM -
          HELP_HEIGHT
          END
        2:QUADRANT=2
          BEGIN
          --Help will be in quadrant 3--
          HELP_LOC_X=SCREEN_LEFT+1
          HELP_LOC_Y=SCREEN_BOTTOM -
          HELP_HEIGHT
          END
        3:QUADRANT=3
          --Help will be in quadrant 2--
          ''
          ''
        4:QUADRANT=4
          --Help will be in quadrant 1--
          ''
          ''
      ENDCASE
END
```

Refer next specifically to FIG. 5. First, a user positions a cursor, such as underline 20 in FIG. 2, under an item or object about which information or help is desired. A help key is then depressed. This is depicted by block 21.

Three cases are to be considered for location of the help window. The first is illustrated in FIG. 2 wherein the screen is already filled. In this case, an opposite quadrant is sought as indicated by block 22. Help is then displayed in this opposite quadrant as indicated by block 23. The corresponding line in the above program design language is CALL OPPOSITE_QUAD.

The second is illustrated in FIG. 3 wherein the menu and help window will both fit on the screen at the same time. A clear quadrant opposite the point help is needed is sought as indicated by block 24. When found by decision block 25, help is displayed as indicated by block 26. It is irrelevant which of the clear quadrants help is displayed in. With this being the case, the opposite quadrant is chosen by default. The corresponding line in the above program design language is CALL FIND_CLEAR. If a clear quadrant is not found by decision block 25, the operations of blocks 22 and 23 are performed and help is displayed in an opposite quadrant. The corresponding line in the above program design language is CALL OPPOSITE_QUAD.

The third case is illustrated in FIG. 4 wherein there is insufficient room for help to be displayed even though there are blank areas on the screen in quadrants 1 and 3. Here a quadrant opposite the quadrant in which help is requested is sought as indicated by block 27. Help is then displayed in a partially overlapping manner as indicated by block 28. The corresponding line in the above program design language is CALL OPPOSITE_QUAD.

In summary, a unique method of, and system for, helping a user is provided such that user friendliness is improved and confusion is reduced. When help is called, a blank area on a display screen adjacent an operating point is sought. A determination is made as to whether a minimum amount of meaningful help can be displayed in this blank area. If so, sufficient help information to fill the blank area is windowed and displayed in the blank area. If the blank area is of insufficient size to carry a minimum amount of meaningful help information, a minimum amount of meaningful help information is windowed and displayed on the screen adjacent the operating point. If additional help information is needed, the user can call for scrolling or an increase in the size of the window. If the window is covering up needed information, the user can call for either decreasing the size of the window, or move the window to a more convenient position on the screen.

While the invention has been particularly shown and described with reference to a preferred embodiment, it will be understood by those skilled in the art that various changes in form and detail may be made without departing from the spirit and scope of the invention.

We claim:

1. In a keyboard/display computer system, a method of improving user friendliness in displaying help information to said user of a keyboard/display computer system, said method comprising the steps of:

activating a help routine stored within said computer system to display help information related to an operation point at which said help routine is activated;

searching for an unused portion of a display screen of said system;

displaying help information related to said operation point, in response to said step of searching wherein said unused portion was found, in a window within said unused portion nearest the operating point on said display screen so that existing information displayed on said screen is not overlapped or, alterntely wherein said unused portion was not found, in said window on said display screen nearest said operating point wherein said help information is positioned over existing information displayed on said screen which is unrelated to said operating point.

2. A method according to claim 1 including the step of sizing said window in order for as much of said as practicable to information related to said operation point remains viewable.

3. A method according to claim 1 including the step of sizing said window to fit within said unused portion.

4. A method according to claim 1 including the step of displaying a reference to said operating point within said window.

5. A method according to claim 1 including the step of displaying help information appropriate to an operation being performed at said operating point.

* * * * *

UNITED STATES PATENT AND TRADEMARK OFFICE
CERTIFICATE OF CORRECTION

PATENT NO. : 4,789,962
DATED : December 6, 1988
INVENTOR(S) : R. E. Berry et al

It is certified that error appears in the above-identified patent and that said Letters Patent is hereby corrected as shown below:

Col. 8, lines 6-7, delete "alterntely" and insert --alternately--.

Col. 8, line 14, before "as" (second occurrence) insert --information related to said operation point--.

Col. 8, lines 15-16, delete "information related to said operation point".

Signed and Sealed this

Thirty-first Day of December, 1991

Attest:

HARRY F. MANBECK, JR.

*Attesting Officer*　　　　*Commissioner of Patents and Trademarks*